(No Model.)

F. PENTLARGE.
Boring Tool.

No. 234,686. Patented Nov. 23, 1880.

Witnesses:
Leo Rosenberg
R. Francis Wheeler.

Inventor:
Frederick Pentlarge
by P. R. Voorhees
Attorney

N. PETERS, PHOTO-LITHOGRAPHER, WASHINGTON, D. C.

UNITED STATES PATENT OFFICE.

FREDERICK PENTLARGE, OF BROOKLYN, NEW YORK.

BORING-TOOL.

SPECIFICATION forming part of Letters Patent No. 234,686, dated November 23, 1880.

Application filed August 3, 1880. (No model.)

*To all whom it may concern:*

Be it known that I, FREDERICK PENTLARGE, of Brooklyn, in the county of Kings and State of New York, have invented a new and useful Improvement in Boring-Tools, which improvement is fully set forth and illustrated in the following specification and accompanying drawings.

The object of this invention is to provide a boring-tool to be driven in a lathe or other power-driven machine at high velocity, which tool shall be more durable and efficient than those boring-tools commonly used, which in consequence of rapid wear when in constant use, from the necessity of frequent sharpening, either occasion much loss of time thereby or are very soon rendered useless, their forms not permitting of much wear before the destruction of some of their essential cutting elements.

The invention consists of the boring-tool, as hereinafter described and claimed, illustrated in Figures 1, 2, 3, and 4 of the drawings.

Figure 5:
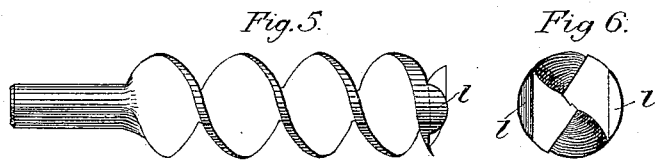
Figure 6:
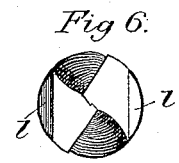

Figs. 5 and 6 of the drawings illustrate a tool forming no part of this invention, but illustrated and described for the purpose of more clearly distinguishing this invention and showing its distinctive features in view of the state of the art.

Figure 1:
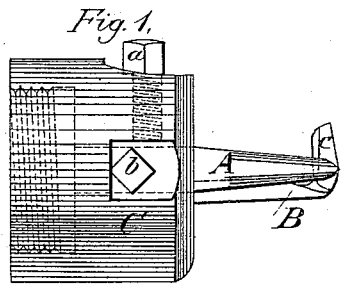
Figure 3:
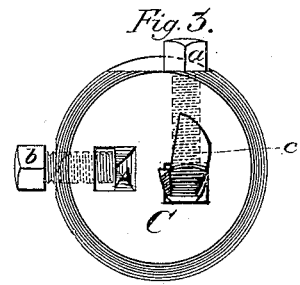
Figure 4:
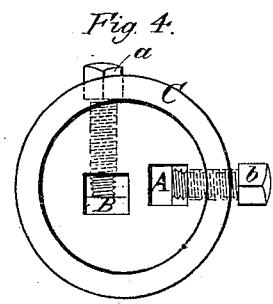
Figure 2:
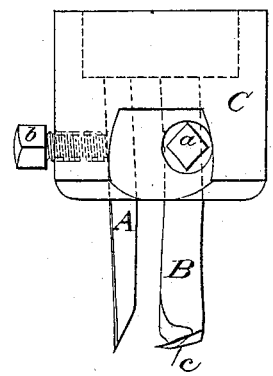

Fig. 1 is a side elevation of the tool as secured in its chuck or holder, and Fig. 2 is a plan of the same. Fig. 3 is a front elevation, and Fig. 4 a rear elevation, of the tool and chuck.

The complete tool, as an instrument for boring very perfect and true round holes, consists of the two cutting-tools A and B secured within a common chuck, stock, or center, C, by means of the set-screws $a\ b$, or otherwise, as clearly shown in the drawings.

It is of course understood that the exact points of junction of the tools A and B with the chuck C are of no moment. Said tools may be secured thereto at any convenient points and in any suitable manner, due regard being had to strength, the shanks or stems of the tools being, if necessary, bent or set as may be required, so that the tools A and B shall run true.

The tool A is a chisel-pointed, rounded, and tapered blade or scriber, slightly bent, set, or ground out of a straight line in the direction of its length. Its sole function is to cleanly cut down or scribe into the bored material the edges or peripheral wall or boundary of the hole to be bored.

The inner tool, B, is a hooked or bent tool, having its cutting blade or lip $c$ set mainly to one side at nearly right angles with its stem or shank B, the cutting-edge of said lip being ground down to the necessary sharpness and extended slightly over or around the shank, opposite its widest part, so that some portion of said lip, at all points of its revolution, entirely covers the center of the circle described by the outer scribing-tool, A. The effect and function of the said lip are thus as a single instrument to rout out the entire area of the hole, including its center portion, the entire depth of the hole, whose bottom is left a plane and smooth surface without any bored-out center below or beyond it.

The exact shape of the blade or lip $c$ cannot be better described than by a reference to the several figures of the drawings illustrating its outlines, the function of said blades being that of a routing-tool auxiliary to the circumscribing-tool A. The tool A, therefore, clearly defines and cuts the walls or circumference of the hole in the act of boring, while the solid interior or area of the hole is routed or cut out in the form of chips and discharged, the result being a cleanly-cut hole bored with great rapidity.

A circular hole can be, and frequently is, cut by a tool similar to that illustrated in side and end elevation, respectively, in Figs. 5 and 6. This tool is a common form of auger or similar instrument for boring holes when driven by a rapidly-rotated power-driven center or chuck. The objection to this tool, however, is that it can be provided with only small scribing or peripheral lips $l\ l$, which, if the tool be required for constant daily service in boring holes, very soon become worn down and finally filed out or off, for such tool cannot be ground upon a stone in the process of sharpening them when the tool is no longer of any service as a boring instrument, having performed no work commensurate with its cost.

It can now be readily understood that the tool hereinabove described as forming the subject of this invention, from the relative arrangement and shape of its two cutting devices when contrasted with the tool last described, must have a much longer duration of life while performing the same character of work; for both the scriber B and the blade c can be ground and sharpened upon a grindstone and resharpened time and time again, and readjusted in the chuck C, whereas the scribing-lips $l$ in the auger illustrated in Figs. 5 and 6 are incapable of either renewal or readjustment when worn in service, and the use of the file in sharpening said auger requires a greater loss of time than if it could be sharpened upon a grindstone. Both of the blades A and B can also be tempered and made too hard for the file to touch, though readily sharpened by grinding, and when required can be dressed and drawn under the hammer preparatory to retempering and grinding, thus greatly prolonging the life of the tool and saving expense of manufacture. A common twist-drill has also been used as a boring-tool with lips prolonged like the lips $l$ $l$ of Figs. 5 and 6. Such lips can only be renewed by the file, and are usually made as long as possible to increase their length of service; but when thus made they cut the sides of the hole much too deep and beyond the bottom of the hole, for some purposes injuring or spoiling the material bored.

This invention is specially useful as a wood-boring tool, but is not confined to such use exclusively.

Having thus fully described my improvement in boring-tools as of my invention, I claim—

1. An adjustable rotary routing-tool, consisting of a stem or shank, B, having one end formed or drawn into an angular center routing-blade, c, substantially of the form described, in combination with and adapted to be operated in a lathe-chuck or by a boring-bar or other equivalent device, as and for the purposes set forth.

2. An adjustable rotary routing-tool, consisting of a shank, B, having one end formed or drawn into an angular center routing-blade, c, and an outer adjustable tapered and pointed scribing-tool, A, said tools being combined in a lathe-chuck or equivalent device, and adapted to be operated and arranged and operating substantially as and for the purposes set forth.

FREDERICK PENTLARGE.

Witnesses:
WM. R. BEESTON,
LEON HIRSH.